Patented Nov. 18, 1941

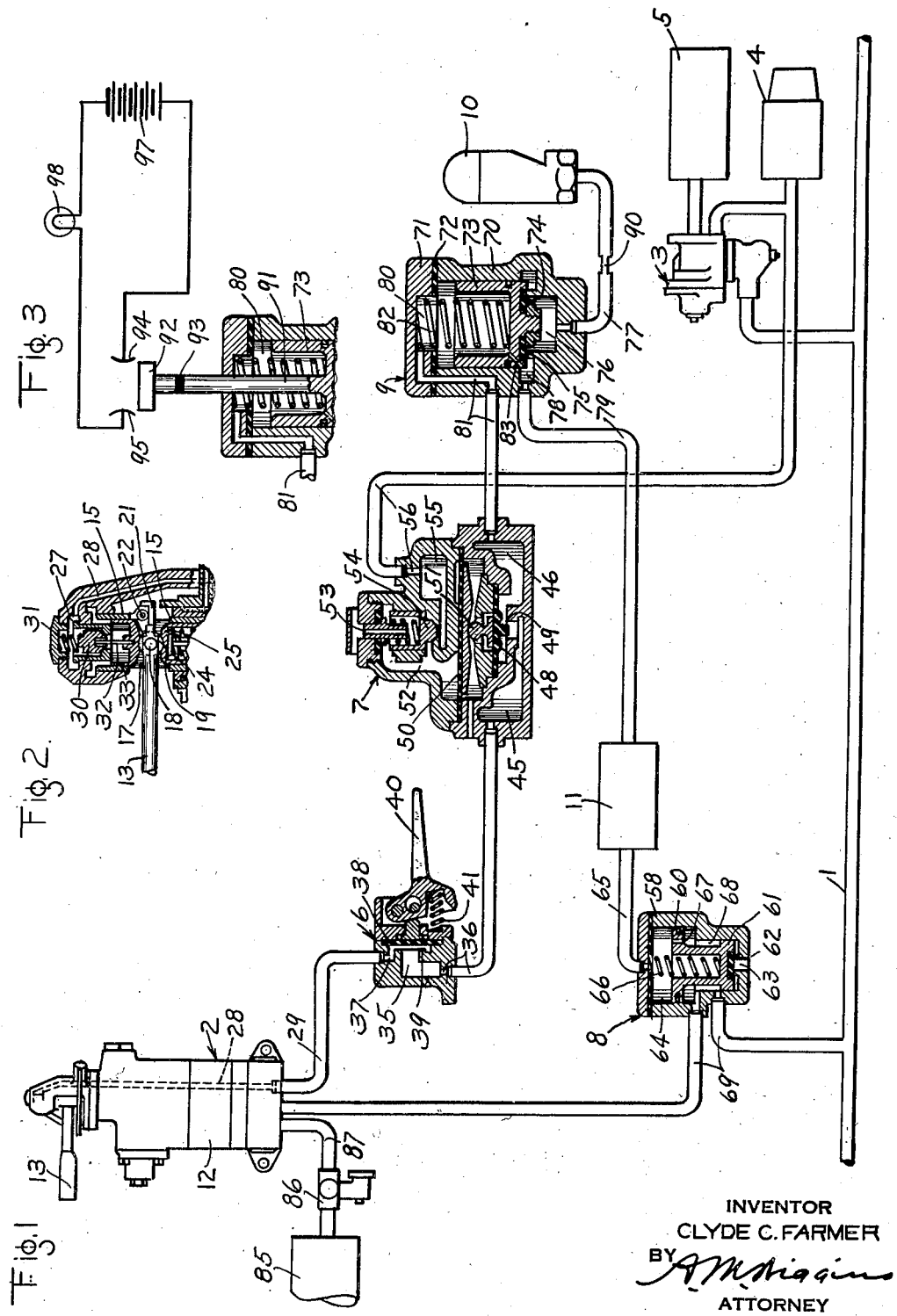

2,263,330

UNITED STATES PATENT OFFICE 2,263,330

BRAKE CONTROL MEANS

Clyde C. Farmer, Pittsburgh, Pa., assignor to The Westinghouse Air Brake Company, Wilmerding, Pa., a corporation of Pennsylvania Application July 27, 1940, Serial No. 347,826

7 Claims. (Cl. 303—19)

This invention relates to fluid pressure brakes, and more particularly to fluid pressure brake equipment having automatic safety control features.

Railway vehicles in certain classes of service are provided with fluid pressure brake apparatus of the safety control type, in which is included a triple valve device of suitable design operative in accordance with a reduction in fluid in a brake pipe to effect application of the brakes, and automatic safety control or "deadman" mechanism designed to function only in the event of incapacitation of the operator to vent fluid under pressure from the brake pipe at an emergency rate to cause an emergency brake application. With such equipment the safety control or "deadman" mechanism is set in operation immediately and without warning each time the operator releases both a foot pedal and the handle of the usual brake valve device. Occasionally, the operator of a passenger train so equipped may by mistake or accident remove his hand and foot from the respective valve device and thereby cause a "deadman" emergency application when an emergency stop is entirely unnecessary and not intended, with the result that the train and its passengers are subjected to undesired shocks which are particularly severe if the train is proceeding slowly when the emergency brake application occurs.

The principal object of the invention is to provide an improved fluid pressure brake equipment of the above type having means for permitting the operator to prevent accidental operation of the safety control mechanism which would result in an emergency application of the brakes, by preforming a required act in response to a warning signal indication.

Another object of the invention is to provide means which when embodied in a brake system of the above type will delay the operation of the safety control mechanism for an interval of time of such duration as to permit the operator to prevent an accidental and undesired deadman application of the brakes.

A further object of the invention is to provide a fluid pressure brake equipment of the above type having means operative automatically for indicating when a safety control or deadman application of the brakes is about to be automatically effected, so that if the operator has by accident or mistake set the control mechanism in operation he may, within a limited interval of time, recapture control of the mechanism before an application of the brakes can be effected.

Other objects and advantages will appear in the following more detail description of the invention.

In the accompanying drawing: Fig. 1 is a diagramatic view, mainly in section, of a fluid pressure brake equipment, including safety control mechanism embodying my invention; Fig. 2 is a fragmentary sectional view showing in section a portion of the brake valve device illustrated in outline in Fig. 1; Fig. 3 shows a modification of the equipment illustrated in Fig. 1.

Referring to Fig. 1 of the drawing, the fluid pressure brake equipment may comprise a brake pipe 1, a brake valve device 2, a triple valve or brake controlling valve device 3, a brake cylinder 4, an auxiliary reservoir 5, a foot valve device 6, a cut off valve device 7, a brake pipe vent valve device 8, a warning control valve device 9, a warning whistle 10 and a volume reservoir 11.

The brake valve device 2 illustrated in Figs. 1 and 2 may be of a type similar to that shown and described in the U. S. Patent No. 2,106,483 issued to E. E. Hewitt on January 25, 1938. This brake valve device comprises a casing structure 12 containing the usual rotary valve, which is adapted to be operated by means of a handle 13 for controlling normal operation of the brake equipment. The handle 13 is connected to the rotary valve through the medium of a shaft, not shown, and a rotatable sleeve member 15 which is secured to the shaft. As shown in Fig. 2 of the drawing, the inner end portion of the handle 13 extends through a slot 17 formed in the sleeve member 15, and is pivotally connected to the sleeve member by means of a pin 18 carrying a roller 19. Formed on the inner end of the handle 13 is an extension 21 adapted for rocking engagement with a retaining member 22 that is carried by the rotatable sleeve member 15.

The handle is adapted to be tilted upwardly under the force of a coil spring 24, which acts through the medium of a cylindrical member 25 slidably mounted within the sleeve member 15 and acting against the roller 19, the extension 21 of the handle fulcruming on the retaining member 22. Formed in the upper portion of the casing of the brake valve device is a valve chamber 27 which communicates by way of a passage 28 with a pipe 29, and which has mounted therein a vent valve 30 that is normally biased toward seated position by a spring 31. The vent valve 30 is adapted to be raised to its unseated position through the medium of a stem 32 and hollow plunger 33 by upward movement of the roller 19 when the handle 13 is released by the operator as hereinafter explained.

The triple valve or brake controlling valve device 3, the auxiliary reservoir 4 and the brake cylinder 5 are each of the usual well known type.

The triple valve or brake controlling device 3 is operative upon an increase in the pressure of fluid in the brake pipe in charging the equipment to establish a communication between the brake pipe and the auxiliary reservoir through which fluid under pressure may flow from the brake pipe to the auxiliary reservoir. At the same time, the triple valve or brake controlling valve device is adapted to connect the brake cylinder to the atmosphere to effect a release of the brakes in the usual well known manner. This valve device 3 is operative upon either a service or an emergency rate of reduction in the pressure of fluid in the brake pipe to cut off communication between the brake pipe and the auxiliary reservoir and between the brake cylinder and the atmosphere and at the same time, establish communication between the auxiliary reservoir and the brake cylinder through which fluid under pressure may flow from the auxiliary reservoir to the brake cylinder to effect either a service or an emergency application of the brakes.

The foot valve device 6 may be of the usual well known construction comprising a casing having a valve chamber 35 communicating with a passage and pipe 36, and a chamber 37 which is connected to the pipe 29 leading to the valve chamber 27 of the brake valve device 2. Communication between the valve chamber 35 and the chamber 37 of the foot valve device is controlled by means of a diaphragm valve 38 which is adapted to be actuated into seated engagement on an associated annular valve seat 39, when the usual pivoted foot pedal 40 is depressed. The diaphragm when thus seated cuts off communication between chambers 35 and 37. When the manually applied pressure on the foot pedal 40 is relieved a spring 41 shifts the pedal upwardly and thus the diaphragm valve 38, due to its inherent resiliency, moves away from its seat and establishes communication between chambers 35 and 37.

The cut off valve device 7 is of the usual well known construction comprises a casing having formed therein a chamber 45 connected to the pipe 36 and also having formed therein a chamber 46 communicating with a pipe 47. There is a communication between these chambers 45 and 46 which is controlled by a diaphragm valve 48 that is arranged for engagement with a seat 49. For moving the diaphragm valve 48 into seated position there is provided a diaphragm 50 which is operatively connected with the diaphragm valve through the medium of a follower arrangement 51. At one side of the diaphragm 50 there is a chamber 52 which is normally in communication with the atmosphere by way of a passage 53. Contained in this chamber is a normally seated pilot valve 54 which is operatively mounted in the casing for controlling the supply of fluid under pressure to the chamber 52 from a chamber 55 as will hereinafter be described. This chamber 55 is constantly open to the brake cylinder 4, by way of a passage and pipe 56.

The vent valve device 8 comprises two spaced pistons 60 and 61 of different diameters, the smaller piston 61 being provided in its outer face with a valve 62 for controlling communication between a chamber at the outer face of said piston and an atmospheric exhaust port 63. A chamber 64 is provided at the outer face of the large piston 60 and is connected to a pipe 65, leading to the volume reservoir 11. A spring 66 is contained in chamber 64 which at all times acts to urge the piston in a direction toward the seat for the valve 62. A port 67 of small flow area is provided through piston 60 which connects chamber 64 to an intermediate chamber 68, through which port the pressures in said chambers normally equalize, but the flow of fluid through the port will be so restricted with respect to the flow of fluid to the chamber 68 that upon venting fluid under pressure from chamber 64, a differential of fluid pressure will be established on the piston 60 which will move both pistons upwardly against the opposing pressure of spring 66 to venting position in which the face of the piston 60 seals against a gasket 58, and in which the valve 62 will be in its unseated position. In the normal position of pistons 60 and 61, the chamber 68 is connected to the portion of the brake pipe branch pipe 69 leading from the brake valve device 2 and is also connected to the portion of the branch pipe leading to the brake pipe 1, but with the pistons in their upper positions communication between chamber 68 and the portion of the branch pipe leading to the brake pipe is cut off and communication between this portion of the branch pipe and the exhaust port 63 is established through which an emergency reduction in brake pipe pressure is adapted to be effected.

The warning control valve device 9 may comprise a body section 70 and a cap section 71 which are secured together in any suitable manner, there being a sealing gasket 72 clamped between the sections 70 and 71. The body section 70 is provided with a cylindrical bore in which there is mounted a piston 73, the lower end being provided at the outer face with a valve 74 adapted to engage an annular seat rib 75 formed on the body section 70. A chamber 76 within the seat rib 75 is connected through a choked pipe 77 with the warning whistle 10, which whistle may be of any well known type adapted to be operated by fluid under pressure.

A chamber 78 is provided outside of the seat rib 75 and is connected to a pipe 79 leading to the volume reservoir 11. A chamber 80 is provided at the opposite side of the piston and is connected to a passage and pipe 81 leading to the chamber 46 in the cut-off valve device 7. A spring 82 is provided in chamber 80 for urging the piston to a position for seating valve 74 as will hereinafter be more fully described. A flow restricting port 83 is provided through piston 73 connecting chamber 77 to chamber 79, through which the pressures in said chambers normally equalize, but this port is of such flow area that upon venting fluid under pressure from chamber 79, a differential of fluid pressure will be established on the piston 73 which will cause the piston to move upwardly against the opposing pressure of spring 82 to a position defined by engagement of the piston 73 with the gasket 72 and in which position the valve 74 is open. In the normal position of the piston 73, the valve 74 by engagement with the seat 75 cuts off communication between chambers 76 and 77, but in the upper position thereof this communication is open and chambers 76 and 77 are connected together.

*Operation*

When locomotive brake equipment of this type is being charged with fluid under pressure, or when charged and running over the road with the brakes released, the brake valve device 2 is held in a brake pipe charging position and either the brake valve handle 13, or the foot pedal 40, or both the handle and the pedal, are held in their depressed position to prevent a deadman application of the brakes.

Charging

Assuming that the handle 13 of the brake valve device is held in a charging position such for instance as running position and is also held depressed, fluid under pressure for charging the equipment is supplied from the usual main reservoir 85, to the brake pipe 1 by way of the usual regulating feed valve device 86, a pipe 87, brake valve device 2, the upper portion of the brake pipe branch pipe 69, chamber 68 in the brake pipe vent valve device 8 and the lower portion of the brake pipe branch pipe. As the brake pipe 1 is thus charged with fluid under pressure, the triple or brake controlling valve device 3 is in its usual release position to effect charging of the auxiliary reservoir and to connect the brake cylinder 4 and the connected chamber 55 in the cut off valve device 7 to the atmosphere. Under these conditions the cut-off valve device 7 will be in the position shown in the drawing, thus connecting the chambers 45 and 46 together.

Since the handle 13 of the brake valve device 2 is held depressed against the opposing force of the spring 24, the spring 31 will maintain the valve 30 in its seated position for maintaining the communication from the valve chamber 27 to the atmosphere closed, as shown in Fig. 2 of the drawing. Under these conditions fluid under pressure supplied to chamber 68 of the brake pipe vent valve 8, flows through the small port 67 in the piston 60 to chamber 64. Fluid under pressure thus supplied to chamber 64 flows by way of pipe 65 to the volume reservoir 11 from whence it flows by way of pipe 79 to the chamber 78 of the warning valve device 9, then through small port 83 in the piston 73, chamber 80, passage and pipe 81, through chamber 46 in the cut-off valve device 7, past unseated valve 48, through chamber 45, pipe and passage 36, chamber 35 in the foot valve device 6, past unseated diaphragm valve 38, chamber 37, pipe 29, passage 28 in the brake valve device 2 and chamber 27 charging these pipes, passages and chambers to the normal pressure carried in the brake pipe 1.

The fluid under pressure in chambers 68 and 64 of the brake pipe vent valve device 8 quickly equalizes through the port 67 in the piston 60 so that the spring 66 maintains the pistons 60 and 61 in the position shown in the drawing. At the same time fluid under pressure in chambers 78 and 80 of the warning valve device 9 quickly equalizes through port 83 in the piston 73 and as a consequence the spring 82 maintains the piston 73 in the position shown in the drawing.

Normal operation

If the operator desires to effect either a service or an emergency application of the brakes, assuming that he maintains either the handle 13 of the brake valve device 2 or the foot pedal 40 of the foot valve device 6 depressed, he moves the brake valve handle 13 and thereby the several other parts of the brake valve device from running position into either service or emergency position, as the case may be for effecting either a service or an emergency reduction in brake pipe pressure in the usual well known manner.

The triple valve device 3 responds in the usual and well known manner, to the service or emergency reduction in brake pipe pressure to cut off the atmospheric communication from the brake cylinder and to supply fluid under pressure from the auxiliary reservoir 5 to the brake cylinder 4 for applying the brakes. Since the chamber 55 of the cut-off valve device 7 is connected to the brake cylinder 4 by way of passage and pipe 56, fluid under pressure from the brake cylinder 4 flows to the chamber 55. When the brake cylinder pressure acting in chamber 55 is increased sufficiently to unseat the spring loaded pilot valve 54 of the cut-off valve device 7, fluid under pressure is admitted to chamber 52 and the pressure of this fluid acting on the diaphragm 50 causes diaphragm valve 48 to be actuated into seating engagement with the seat 49 thus cutting off communication between chambers 46 and 45 of the cut-off valve device.

Thus, if the operator, by operation of the brake valve device, effects a sufficient increase in brake cylinder pressure to produce adequate braking, he may remove both his hand from the brake valve handle 13, and his foot from the foot pedal 40, without venting fluid under pressure from the control pipe 81. Since the control pipe is not vented a safety control or deadman emergency application of the brakes is prevented, as will be understood presently from the description which follows.

To effect the release of the brakes following either a normal brake valve service or emergency application, the operator merely shifts the brake valve handle and thereby the other brake valve parts to running position, thus effecting an increase in brake pipe pressure in the usual well known manner. The handle 13 or the foot pedal 40 or both the handle and the foot pedal are depressed at this time, so that the brake pipe vent valve device 8 will remain in its normal position.

With the increase in the pressure of fluid in brake pipe 1 the triple valve device 3 is returned to its normal release position in which the brake cylinder 4 is vented to the atmosphere, to effect a complete release of the brakes, and the auxiliary reservoir 5 is recharged with fluid under pressure from the brake pipe 1. Since the brake cylinder 4 is vented to the atmosphere the connected chamber 55 in the cut-off valve device 7 is also vented by way of passage and pipe 56. When the pressure of fluid in chamber 55 has been reduced a predetermined degree, the pressure of the spring of the cut-off valve device 7 causes the plunger therein to move downwardly, seating the valve 54 and opening the passage 53 to the atmosphere. With the valve 54 seated and the passage 53 open to atmosphere, fluid under pressure in chamber 52 is discharged to the atmosphere and as the fluid under pressure in this chamber is reduced, fluid under pressure acting on the under side of the flexible diaphragm 50 causes the diaphragm 38 to flex upwardly and the pressure of fluid acting in chamber 46 moves the valve 48 away from its seat 49 thereby establishing communication between chambers 46 and 45 through which fluid under pressure is supplied for charging pipe 36 as hereinbefore described.

Safety control or deadman emergency application

According to the invention, the safety control equipment is adapted for automatic operation to effect an emergency application of the brakes if the operator should release both the foot pedal 40 and the handle 13 of the brake valve device 2, without having first caused an adequate application of the brakes to be effected through the medium of the brake valve device in the usual manner, as hereinbefore described.

Assuming the foot controlled valve 38 of the foot valve device 6 to be open and other valve devices of the equipment in release position, as shown in the drawing, if the operator withdraws his hand from the handle 13 of the brake valve device 2, the spring 24 acts through the medium of the member 25 and roller 19 to tilt the handle upwardly about the fulcrum member 22, thus causing the plunger member 33 and stem 32 to unseat the vent valve 30.

When the vent valve 30 of the brake valve device 2 is thus unseated, fluid under pressure is discharged from the chamber 80 of the warning valve device 9 to the atmosphere by way of passage and pipe 81, chamber 46 of the cut-off valve device 7, past unseated diaphragm valve 43 thereof and through chamber 45, pipe and passage 36, connected chambers 35 and 37 of the foot valve device 6, pipe 29, passage 28 of the brake valve device 2, valve chamber 27, and past the vent valve 30.

This venting of fluid from chamber 80 is at a faster rate than fluid under pressure can flow to the chamber through the small port 83 in the piston 73, thus effecting a reduction in the pressure of fluid in chamber 80, so that the higher pressure in chamber 78 causes the piston 73 to move against the opposing pressure of the spring 82 to unseat the valve 74 from its seat rib 75. As the valve 75 moves away from its seat the full area of the valve end of the piston is exposed to the pressure of fluid in chamber 78 and as a consequence the piston 73 is quickly shifted to its upper seat with a snap like action.

With the valve 74 in its unseated position, fluid under pressure from the volume reservoir 11 and connected chamber 64 in the brake pipe vent valve device flows to the atmosphere by way of pipe 79, chambers 78 and 76 in the warning valve device 9, pipe 77, a choke 90 in pipe 77 and warning device 10, the flow of fluid causing the warning device 10 to produce a signal.

Due to the volume reservoir being in open communication with the chamber 64, the decrease in the pressure of fluid in this chamber due to such venting will be at a slow rate. However, when the pressure of fluid in chamber 64 together with the pressure of spring 66 is less than the brake pipe pressure in chamber 68, the pistons 60 and 61 will be caused to move upwardly until the piston 60 engages the gasket 58. This movement of the pistons 60 and 61 closes communication through the brake pipe branch pipe 69 from the brake valve device 2 to the brake pipe 1, thereby cutting off the supply of fluid under pressure to said brake pipe. At the same time, upward movement of the piston 61 unseats valve 62 and thereby permits fluid under pressure to flow from the brake pipe 1 to the atmosphere by way of the vent port 63, at an emergency rate, thereby effecting an emergency reduction in brake pipe pressure. The triple valve 3 responds to the reduction in brake pipe pressure at the emergency rate to operate in the usual well known manner to effect an emergency application of the brakes.

If the operator is not incapacitated but has by mistake or accident set the safety control mechanism in operation he may by promptly depressing either the brake valve handle 13 or foot pedal 40, or both, cut-off the atmospheric communication from the chamber 80 of the warning valve device 9, before the vent valve device 8 operates to vent brake pipe pressure to the atmosphere to effect an emergency application of the brakes.

*Modification of Fig. 3*

Referring to Fig. 3 of the drawing, there is illustrated a warning valve device embodying a slightly modified form of the invention. In this form of the invention, the piston 73 in valve device 9 is provided with a stem 91 which extends to the exterior of the casing and is provided at the end thereof with a contact plate 92 which is insulated from the stem by a block of insulation material 93. The plate 92 is adapted to engage contacts 94 and 95 when the piston 73 is moved to its upper position.

The operation of the apparatus shown in Fig. 3 will be readily understood from the description hereinbefore presented in connection with Fig. 1 of the drawing. When the fluid under pressure in chamber 80 is vented to the atmosphere thereby causing the fluid under pressure in chamber 78 to move piston 73 to its uppermost position, the contact plate 92 will engage contacts 94 and 95. With contact plate 92 engaging contacts 94 and 95 an electrical circuit is completed through a battery 97 and a lamp 98, which lamp may be located at the operator's station. Thus the operator will have visual indication that a deadman application is about to be set in operation. It will be understood that the lower portion of the piston 73 will be the same as shown in Fig. 1, and that when the piston moves to its upper position, the reservoir 11 and chamber 64 in the vent valve device 8 will be vented to the atmosphere by way of pipe 79, chambers 78 and 76 in the warning valve device 9, pipe 77 and choke 90, the warning whistle 10 being omitted in this form of the invention.

From the foregoing description it will be understood that when, due to the incapacitation of the operator or to mistake or carelessness on his part, he takes his hand from the brake valve handle 13 and his foot from the foot pedal 40, a warning signal will be automatically produced at the operator's station before an automatic safety control application of the brakes is effected, there being a delay of predetermined duration between the production of the signal and the application of the brakes. This timing feature is embodied in the equipment to make it possible for the operator if he is not incapacitated to regain control of the brakes before the automatic application has been actually effected.

While two illustrative embodiments of the invention have been described in detail, it should be understood that the invention is not limited to these details of construction and that numerous changes and modifications may be made without departing from the scope of the following claims.

Having now described my invention, what I claim as new and desire to secure by Letters Patent, is:

1. In a fluid pressure brake equipment of the type having a brake pipe normally charged with fluid under pressure and a brake controlling valve device operative upon a reduction in brake pipe pressure for supplying fluid under pressure to effect an application of the brakes, and a brake valve device operative to effect the reduction in brake pipe pressure, in combination, valve means normally establishing communication between the brake pipe and the brake valve device and being operative to vent fluid under pressure from the brake pipe, manually held means operated upon release by the operator for producing a signal and for effecting the operation of said valve means, and other means for delaying the operation of the valve means for a predetermined interval of time after the signal producing means is set in operation.

2. In a fluid pressure brake equipment of the type having a brake pipe normally charged with fluid under pressure and a brake controlling valve device operative upon a reduction in brake pipe pressure for supplying fluid under pressure to effect an application of the brakes, and a brake valve device operative to effect the reduction in brake pipe pressure, in combination, a normally charged safety control pipe, valve means normally establishing communication between the brake pipe and the brake valve device, and operative upon the venting of fluid from said safety control pipe to vent fluid under pressure from the brake pipe, warning valve means operative upon venting of fluid from said control pipe for producing a signal, manually held means operated upon release by the operator for venting fluid under pressure from the control pipe, and other means for delaying the operation of the valve means for a predetermined interval of time after the warning producing means is set in operation.

3. In a fluid pressure brake of the type comprising a normally charged brake pipe, a brake controlling valve device operative upon a reduction in brake pipe pressure to effect an application of the brakes, and an engineer's brake valve device manually operative to effect a reduction in brake pipe pressure, in combination, a timing reservoir normally charged with fluid under pressure, a brake pipe vent valve device subject to the combined forces of a spring and timing reservoir pressure and an opposing pressure and operative upon a predetermined reduction in the timing reservoir pressure to vent fluid under pressure from the brake pipe, warning valve means operative to cause a signal to be produced and for initiating the reduction in the timing reservoir pressure, means for delaying the attainment of said predetermined reduction in timing reservoir pressure for a predetermined interval of time, and safety control means automatically operative when released manually by the operator to effect the operation of said warning valve means.

4. In a fluid pressure brake of the type comprising a normally charged brake pipe, a brake controlling valve device operative upon a reduction in brake pipe pressure to effect an application of the brakes, and an engineer's brake valve device manually operative to effect a reduction in brake pipe pressure, in combination, a brake pipe vent valve device subject to a control pressure and an opposing pressure and operative upon a predetermined reduction in the control pressure to vent fluid under pressure from the brake pipe, warning valve means operative to cause a signal to be produced and for initiating the reduction in the control pressure, means for so controlling the rate of reduction in said control pressure as to delay the attainment of said predetermined reduction and thereby the operation of said vent valve device to vent fluid under pressure from the brake pipe, and safety control means automatically operative when released manually by the operator to effect the operation of said warning valve means.

5. In a fluid pressure brake of the type comprising a normally charged brake pipe, a brake controlling valve device operative upon a reduction in brake pipe pressure to effect an application of the brakes, and an engineer's brake valve device manually operative to effect a reduction in brake pipe pressure, in combination, a brake pipe vent valve device subject to a control pressure and an opposing pressure and operative upon a predetermined reduction in the control pressure to vent fluid under pressure from the brake pipe, a normally charged safety control pipe, warning valve means operative upon venting of fluid from said safety control pipe to cause a signal to be produced, and for initiating the reduction in the control pressure, means for so controlling the rate of reduction in said control pressure as to delay the attainment of said predetermined reduction and thereby the operation of said vent valve device to vent fluid under pressure from the brake pipe, and manually operative means automatically operative upon release by the operator for venting fluid under pressure from said control pipe.

6. In a fluid pressure brake of the type comprising a normally charged brake pipe, a brake controlling valve device operative upon a reduction in brake pipe pressure to effect an application of the brakes, and an engineer's brake valve device manually operative to effect a reduction in brake pipe pressure, in combination, a timing reservoir normally charged with fluid under pressure, a brake pipe vent valve device subject to the opposing pressures of the brake pipe and the reservoir and operative upon a predetermined reduction in the timing reservoir pressure to vent fluid under pressure from the brake pipe, a normally charged safety control pipe, warning valve means operative upon venting of fluid from said safety control pipe to cause a signal to be produced and for initiating the reduction in the timing reservoir pressure, means for delaying the attainment of said predetermined reduction in timing reservoir pressure for a predetermined interval of time, and means associated with said brake valve device automatically operative when released manually by the operator to vent fluid under pressure from said safety control pipe.

7. In a fluid pressure brake of the type comprising a normally charged brake pipe, a brake controlling valve device operative upon a reduction in brake pipe pressure to effect an application of the brakes, and an engineer's brake valve device manually operative to effect a reduction in brake pipe pressure, in combination, a brake pipe vent valve device subject to a control pressure and an opposing pressure and operative upon a predetermined reduction in the control pressure to vent fluid under pressure from the brake pipe, warning valve means operative to cause a signal to be produced and for initiating the reduction in the control pressure, means for so controlling the rate of reduction in said control pressure as to delay the attainment of said predetermined reduction and thereby the operation of said vent valve device to vent fluid under pressure from the brake pipe, and safety control means automatically operative when released manually by the operator to effect the operation of said warning valve means, and cut-off valve means responsive to a brake application as effected by said brake valve device for preventing operation of said warning valve device regardless of operation of said safety control means.

CLYDE C. FARMER.